(12) United States Patent
Kobayashi et al.

(10) Patent No.: US 12,462,389 B2
(45) Date of Patent: Nov. 4, 2025

(54) IMAGE PROCESSING METHOD, IMAGE PROCESSING PROGRAM, AND IMAGE PROCESSING DEVICE FOR PARTITIONING A 3D OBJECT AT NARROW PARTS OF SHAPE

(71) Applicants: Vocsis Corporation, Kanagawa (JP); TOHOKU UNIVERSITY, Miyagi (JP)

(72) Inventors: Koji Kobayashi, Kanagawa (JP); Koichi Ito, Miyagi (JP); Takafumi Aoki, Miyagi (JP)

(73) Assignees: Vocsis Corporation, Kanagawa (JP); TOHOKU UNIVERSITY, Miyagi (JP)

( * ) Notice: Subject to any disclaimer, the term of this patent is extended or adjusted under 35 U.S.C. 154(b) by 447 days.

(21) Appl. No.: 17/917,934

(22) PCT Filed: Nov. 6, 2020

(86) PCT No.: PCT/JP2020/041447
§ 371 (c)(1),
(2) Date: Dec. 4, 2022

(87) PCT Pub. No.: WO2021/205683
PCT Pub. Date: Oct. 14, 2021

(65) Prior Publication Data
US 2023/0134976 A1  May 4, 2023

(30) Foreign Application Priority Data
Apr. 10, 2020 (JP) .................. 2020-071356

(51) Int. Cl.
*G06T 7/11* (2017.01)
*G06T 7/136* (2017.01)
(Continued)

(52) U.S. Cl.
CPC ............. *G06T 7/11* (2017.01); *G06T 7/136* (2017.01); *G06T 7/187* (2017.01); *G06T 7/194* (2017.01);
(Continued)

(58) Field of Classification Search
CPC . G06T 7/11; G06T 7/187; G06T 7/194; G06T 2200/04; G06T 2207/10081; G06T 7/0012
See application file for complete search history.

(56) References Cited

U.S. PATENT DOCUMENTS

| 2008/0044072 A1* | 2/2008 | Kiraly .................. G06T 7/11 382/128 |
| 2017/0278243 A1 | 9/2017 | Kang et al. |
| 2018/0315191 A1 | 11/2018 | Meng et al. |

FOREIGN PATENT DOCUMENTS

| JP | 2004518186 | 6/2004 |
| JP | 2005304936 | 11/2005 |

(Continued)

OTHER PUBLICATIONS

Tran, Son, and Liwen Shih. "Efficient 3D binary image skeletonization." 2005 IEEE Computational Systems Bioinformatics Conference-Workshops (CSBW'05). IEEE, 2005. (Year: 2005).*

(Continued)

*Primary Examiner* — Sumati Lefkowitz
*Assistant Examiner* — Connor L Hansen

(57) ABSTRACT

The present invention provides an image processing method capable of intuitively recognizing the three-dimensional shape of an organ by limiting the inspection range to the vicinity of the diagnostic target organ in image diagnosis. Given binary three-dimensional data representing an object in three-dimensional space, the image processing method partitions the object into individual segments with boundaries on narrow parts of the object's shape. A series of organs (Continued)

with no numerical differences in the boundaries on the image data can be segmented into individual organs at geometrically constricted locations because the connected organs can be identified by their shape. As a result, it is possible to examine a limited area specific to the target organ during image diagnosis, and to perform the examination while viewing the intuitive 3D shape of the organ during image interpretation.

5 Claims, 5 Drawing Sheets

(51) Int. Cl.
    *G06T 7/187*     (2017.01)
    *G06T 7/194*     (2017.01)
(52) U.S. Cl.
    CPC   *G06T 2200/04* (2013.01); *G06T 2207/10012* (2013.01); *G06T 2207/10081* (2013.01); *G06T 2207/20016* (2013.01)

(56) References Cited

FOREIGN PATENT DOCUMENTS

| | | |
|---|---|---|
| JP | 5181955 | 4/2010 |
| JP | 2011512999 | 4/2011 |

OTHER PUBLICATIONS

International Search Report for PCT Application No. PCT/JP2020/041447, mailed on Nov. 6, 2020.

English translation of written opinion for PCT Application No. PCT/JP2020/041447, mailed on Nov. 6, 2020.

B. A. Skourt et al, "Lung CT Image Segmentation Using Deep Neural Networks," Procedia Computer Science, vol. 127, pp. 109, 2018.

* cited by examiner (a)　　　　　(b)　　　　　(c)

ated with each organ such as the digestive system, respiratory system, and circulatory system.

IMAGE PROCESSING METHOD, IMAGE PROCESSING PROGRAM, AND IMAGE PROCESSING DEVICE FOR PARTITIONING A 3D OBJECT AT NARROW PARTS OF SHAPE

FIELD OF THE INVENTION

The present invention provides an image processing method, an image processing program, and an image processing device for recognizing object by partitioning a 3D object given as 3D binary data that distinguishes foreground region from background region into segments at geometrically constricted locations. The present invention also relates to an image processing device that applies this technology to diagnostic imaging and divides a series of organs into individual organs at geometrically constricted locations.

BACKGROUND OF THE INVENTION

Doctors diagnose specific organs by interpreting 2D images acquired by a medical computed tomography device. Medical image interpretation is the act of inspecting target organ by estimating the 3D structure of the organ by comparing a large number of 2D images, sometimes exceeding 1,000. On the other hand, the 3D processing of computers has made remarkable progress in recent years. If the computer extracts the 3D structure of the target organ, doctor's image diagnosis can limit the data range to the vicinity of the organ. By displaying the shape of the target organ in 3D, doctors can intuitively recognize the shape of the organ without having to compare many 2D images during diagnostic imaging process.

Many methods are known for segmentation technology that extracts specific regions from 3D data. Most segmentation methods look for numerical differences at region boundaries. However, a series of organs that make up a system, such as the digestive system, respiratory system, and circulatory system, are connected, and there is no clear boundary between connected organs. This is because food in the digestive system, air in the respiratory system, and blood in the circulatory system pass between organs. Therefore, existing segmentation techniques cannot segment individual organ from those that make up such systems.

One approach to segmenting organs in such systems is to build a shape model of the organs and fit the 3D data to the model using probabilistic methods. Patent Literature 1 discloses a technique of constructing an anatomical model of the liver and applying 3D data to the model. Another approach is to make training data on organ shapes and generate organ segments through deep learning. Non-Patent Document 1 discloses a technique for generating lung segments from 3D CT data using deep learning.

DESCRIPTION OF THE RELATED ART

Patent Literature

Patent Document 1: National Publication No. 2011-512999

Non-Patent Literature

Non-Patent Document 1: B. A. Skourt, A. El Hassani, and A. Majda, "Lung CT Image Segmentation Using Deep Neural Networks," Proceeding Computer Science, vol. 127, pp. 109, 2018.

SUMMARY OF THE INVENTION

Problem to be Solved by the Invention

Physicians perform diagnostic imaging targeting specific organs but are forced to perform the examinations while estimating the 3D shape of the organs by comparing a large number of 2D images generated by medical CT equipment. By extracting the region of the target organ from the medical images as a segment, the range of data to be inspected can be limited, and the shape of the organ can be intuitively recognized if the organ is displayed in 3D. On the other hand, the human body has a series of organs connected continually such as the digestive system, respiratory system, and circulatory system, through which food, air, and blood flow, respectively. For this reason, existing segmentation methods that look for numerical differences cannot split a set of organs into individual organs if there are no numerical differences at the boundaries of the set of organs. Segmentation techniques that do not look for numerical differences include creating organ segments based on probabilistic models or training data. However, such methods have a problem that it is difficult to objectively verify its performance. For example, it is known that these methods can produce anomalous results when the methods are given an exceptional input of the probabilistic model or training data.

The present invention has been made in view of the above circumstances, and the object of the present invention is to provide an image processing method, an image processing program, and an image processing device for partitioning a 3D object into individual segments at the locations of geometric constriction. Because even individual organs with no numerical differences at their boundaries can be identified from their shape, applying this image processing technique to medical images enables us to identify individual organ segments from a series of organs without the use of probabilistic models or training data.

Because the present invention generates segments for the individual organs, the present invention can provide an image processing device that allows doctors to limit the range of inspection and intuitively recognize the shape of the organ during image diagnosis.

BRIEF SUMMARY OF THE INVENTION

Means to Solve the Problem

In order to achieve the above object, the present invention provides the following means.

The image processing method according to the present invention includes following steps.

An image processing method comprising a distance transformation step of calculating a distance value between each of foreground voxels and boundary of foreground and background regions from binary 3D data that distinguishes the foreground region from the background region. A hierarchical layer generation step of generating hierarchical layers each of which is composed of voxels having a same integer value by converting the distance value to an integer value. A local maximum layer detection step of identifying layers each of which has a larger integer value than layers surrounding the layer as local maximum layers. A core generation step of defining the local maximum layers distinguished by a unique number as cores so as to generate a core. And a segment generation step of partitioning the foreground region into as many segments as the number of the cores such that the voxels in the surrounding layer of the core and adjacent to the core are added to the core incrementally.

An image processing method according to the present invention includes a distance conversion step of calculating a distance value between each of foreground voxels and boundary of the foreground and the background regions from binary 3D data that distinguishes the foreground region from the background region, and a hierarchical layer generation step of generating hierarchical layers each of which is composed of voxels having a same integer value by converting the distance value to an integer value. As a result, the layers form a step-like 3D structure in which integer values increase incrementally from the outer periphery of the foreground region toward the interior. Also, by including a local maximum layer detection step in which a layer having a larger integer value than the surrounding layers is regarded as a local maximum layer, the local maximum layer is positioned at the center of dilated part of the foreground region. By including a core generation step that uniquely numbers the local maxima layers, the cores are located at the center of dilated parts. Furthermore, it includes a segment generation step of partitioning the foreground region into as many segments as the number of the cores such that the voxels in the surrounding layer of the core and adjacent to the core are added to the core incrementally.

As a result, the segments that are the extended cores are bounded by the constriction of the shape of the foreground region. Since the segments are generated in this way, the foreground region of the binary 3D data can be divided into the number of segments as the number of cores in the constrictions of the shape.

Further, in the image processing method according to the present invention, the segment generation step includes an adjacent voxel adding step of adding the voxels in a layer with an integer variable to the core, and the adjacent voxel adding step starts at the integer variable (maximum integer values−1) and repeats until the value is 1.

The segment generation step of the image processing method according to the present invention includes an adjacent voxel adding step of adding voxels of a layer with an integer variable to the core, and adjacent voxel adding step starts at the integer variable (maximum integer values−1) and repeats until the value is 1. Therefore, when there are multiple cores in a surrounding layer with the integer variable, the voxels of the layer adjacent to each core are added to the cores incrementally, and the boundaries of the segments can be created where the extended cores meet.

Further, in the adjacent voxel adding step, the voxels in the layer with the integer variable are added to the core in order of surface contact with the voxel of the core, line contact with the voxel of the core, and point contact with the voxel of the core.

In the adjacent voxel adding step of the segment generation step of the image processing method according to the present invention, the voxels of the layer having the integer variable are added to the core in the order of surface contact, line contact, and point contact with the voxel of the core. The center-to-center distance between an adjacent voxel pair increases in the order of surface contact voxels, line contact voxels, and point contact voxels. Adding voxels to the core in the order of increasing center-to-center distance can reduce the distortions that occurs at the segment boundaries.

The image processing program according to the present invention includes following processes.

A distance transformation process calculating a distance value between each of foreground voxels and boundary of foreground and background regions from binary 3D data that distinguishes the foreground region from the background region. A hierarchical layer generation process generating hierarchical layers each of which is composed of voxels having a same integer value by converting the distance value to an integer value. A local maximum layer detection process identifying layers each of which has a larger integer value than layers surrounding the layer as local maximum layers. A core generation process defining the local maximum layers distinguished by a unique number as cores. And a segment generation process partitioning the foreground region into as many segments as the number of the cores such that the voxels in the surrounding layer of the core and adjacent to the core are added to the core incrementally.

An image processing program according to the present invention executed by a computer includes a distance conversion process calculating a distance value between each of foreground voxels and boundary of the foreground and the background regions from binary 3D data that distinguishes the foreground region from the background region, and a hierarchical layer generation process generating hierarchical layers each of which is composed of voxels having a same integer value by converting the distance value to an integer value. As a result, the layers form a step-like 3D structure in which integer values increase incrementally from the outer periphery of the foreground region toward the interior. Also, by including a local maximum layer detection process in which a layer having a larger integer value than the surrounding layers is regarded as a local maximum layer, the local maximum layer is positioned at the center of dilated part of the foreground region. By including a core generation process that uniquely numbers the local maxima layers, the cores are located at the center of dilated parts. Furthermore, it includes a segment generation process partitioning the foreground region into as many segments as the number of the cores such that the voxels in the surrounding layer of the core and adjacent to the core are added to the core incrementally.

As a result, the segments that are the extended cores are bounded by the constriction of the shape of the foreground region. Since the segments are generated in this way, the foreground region of the binary 3D data can be divided into the number of segments as the number of cores in the constrictions of the shape.

The image processing device according to the present invention includes following sections.

A distance transformation section calculating a distance value between each of foreground voxels and boundary of foreground and background regions from binary 3D data that distinguishes the foreground region from the background region. A hierarchical layer generation section generating hierarchical layers each of which is composed of voxels having a same integer value by converting the distance value to an integer value. A local maximum layer detection section identifying layers each of which has a larger integer value than layers surrounding the layer as local maximum layers. A core generation section defining the local maximum layers distinguished by a unique number as cores. And a segment generation section partitioning the foreground region into as many segments as the number of the cores such that the voxels in the surrounding layer of the core and adjacent to the core are added to the core incrementally.

An image processing device according to the present invention executed by a computer includes a distance conversion process calculating a distance value between each of foreground voxels and boundary of the foreground and the background regions from binary 3D data that distinguishes the foreground region from the background region, and a hierarchical layer generation section generating hierarchical layers each of which is composed of voxels having a same integer value by converting the distance value to an integer value. As a result, the layers form a step-like 3D structure in which integer values increase incrementally from the outer periphery of the foreground region toward the interior. Also, by including a local maximum layer detection section in which a layer having a larger integer value than the surrounding layers is regarded as a local maximum layer, the local maximum layer is positioned at the center of dilated part of the foreground region. By including a core generation section that uniquely numbers the local maxima layers, the cores are located at the center of dilated parts. Furthermore, it includes a segment generation section partitioning the foreground region into as many segments as the number of the cores such that the voxels in the surrounding layer of the core and adjacent to the core are added to the core incrementally.

As a result, the segments that are the extended cores are bounded by the constriction of the shape of the foreground region. Since the segments are generated in this way, the foreground region of the binary 3D data can be divided into the number of segments as the number of cores in the constrictions of the shape.

The image processing device according to the present invention may further include a connected organ shape extraction section generating binary 3D data corresponding to a series of organs from 3D data received from a medical computed tomography device, and an organ segment generation section generating a segment of an individual organ by merging plurality of the segments generated from the output of the segment generation section.

By including a connected organ shape extraction section that generates binary 3D data corresponding to a series of organs from 3D data acquired by a medical computed tomography device and an organ segment generation section generating a segment of an individual organ by merging plurality of the segments generated from the output of the segment generation section, this image processing device can generate segments of individual organ from a set of organs in 3D data.

The image processing device according to the present invention may further include a 3D image generation section generating a stereoscopic image capable of identifying an outer surface and internal structure of each organ from the segment of the individual organ from the segment generation section.

By including a 3D image generation section generating a stereoscopic image capable of identifying an outer surface and internal structure of each organ from the segment of the individual organ from the segment generation section, this image processing device can provide intuitive 3D display of organs which is difficult to recognize from 2D images.

The image processing device according to the present invention may further include a partial 2D image generation section that cuts out a partial region corresponding to a segment of an individual organ from 3D data received from a medical computer tomographic device that generates that partial tomographic images as axial, coronal, and sagittal planes from the partial region.

By including a partial 2D image generation section that cuts out a partial region corresponding to a segment of an individual organ from 3D data received from medical computer tomographic devices, that generates that partial 2D images as axial planes, coronal planes and sagittal planes from the partial region, As the result, by specifying the segments of individual organs to be diagnosed during image diagnosis, doctors can examine 2D images by excluding parts other than those to be examined, such as structures outside the body and organs not to be diagnosed, from the 3D data received from medical computer tomographic devices.

Effect of the Invention

According to this invention, when recognizing a 3D solid object, it has the effect that a solid can be divided into segments by the narrow part of the shape of the object. In addition, in the application of 3D data by medical computed tomography devices, even if there is a series of organs with no numerical differences at the boundaries, individual organs can be identified as bulges in a 3D shape. This has the advantage that a series of organs can be segmented into individual organ segments without relying on training data. Segments of individual organs generated according to the present invention have the effect of limiting the 3D data to be inspected in image diagnosis. It has an effect that the 3D shape of the organ can be grasped intuitively.

BRIEF DESCRIPTIONS OF THE DRAWINGS

FIG. 5(*a*) is the input, FIG. 5(*b*) is the hierarchical layers, FIG. 5(*c*) is the cores, and (*d*) is the segments.

FIG. 6(*a*) shows all segments, and FIG. 6(*b*), FIG. 6(*c*) and FIG. 6(*d*) show three segments individually.

Figure 8:
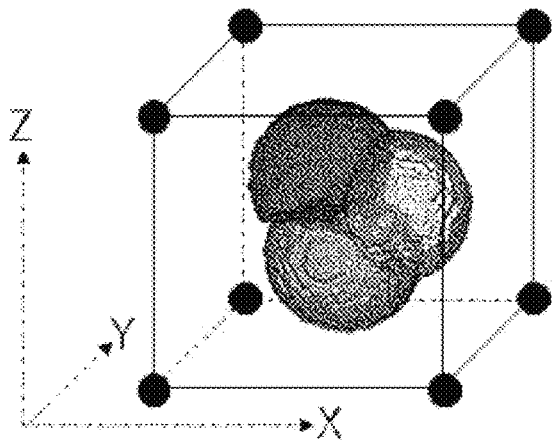
FIG. 8 is a diagram showing eight corners of a 3D space.
Figure 9:
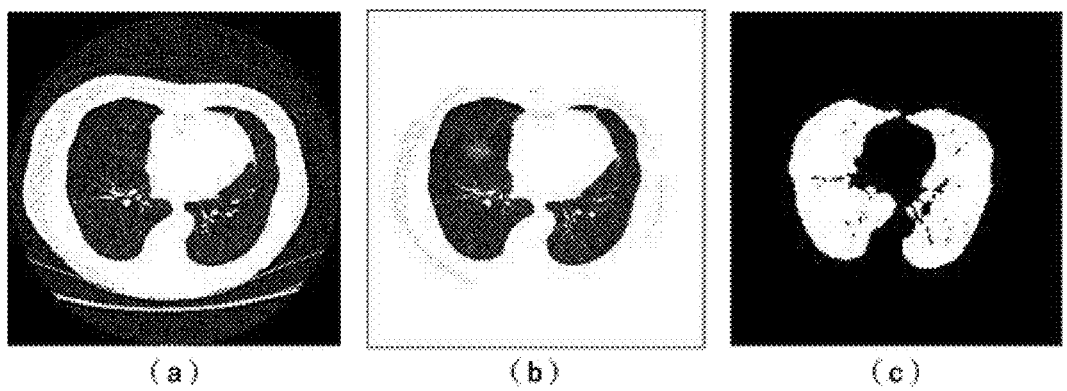

FIG. 9 is a central cross-sectional view of data in an example in which a method of generating binary 3D data in which a series of organs belonging to the respiratory system are connected from 3D data from CT is applied in a connected organ shape extraction section (230). FIG. 8(*a*) is input data, FIG. 8(*b*) is data obtained by replacing the region outside of body with the CT value of water, and FIG. 8(*c*) is data obtained by binarizing the internal region with the air component and extracting the maximum region.

Figure 10:
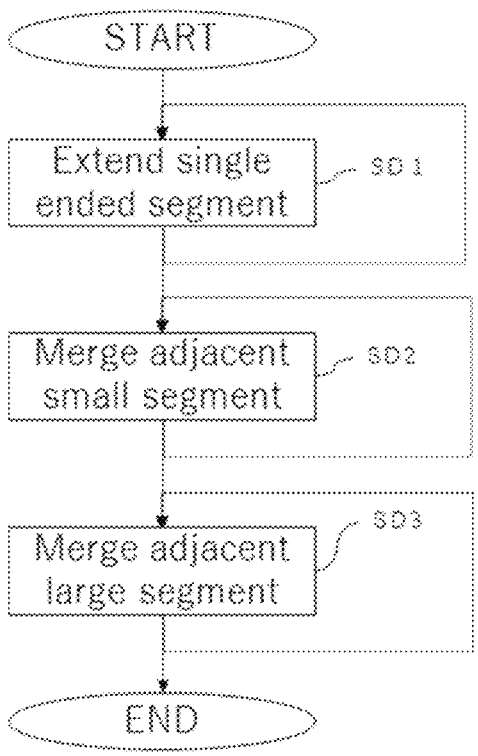

FIG. 10 is a flow chart for explaining a method of generating segments corresponding to individual organs by merging segments generated from a series of binary 3D data of organs belonging to the respiratory system in an organ segment generation section (250).

Figure 11:
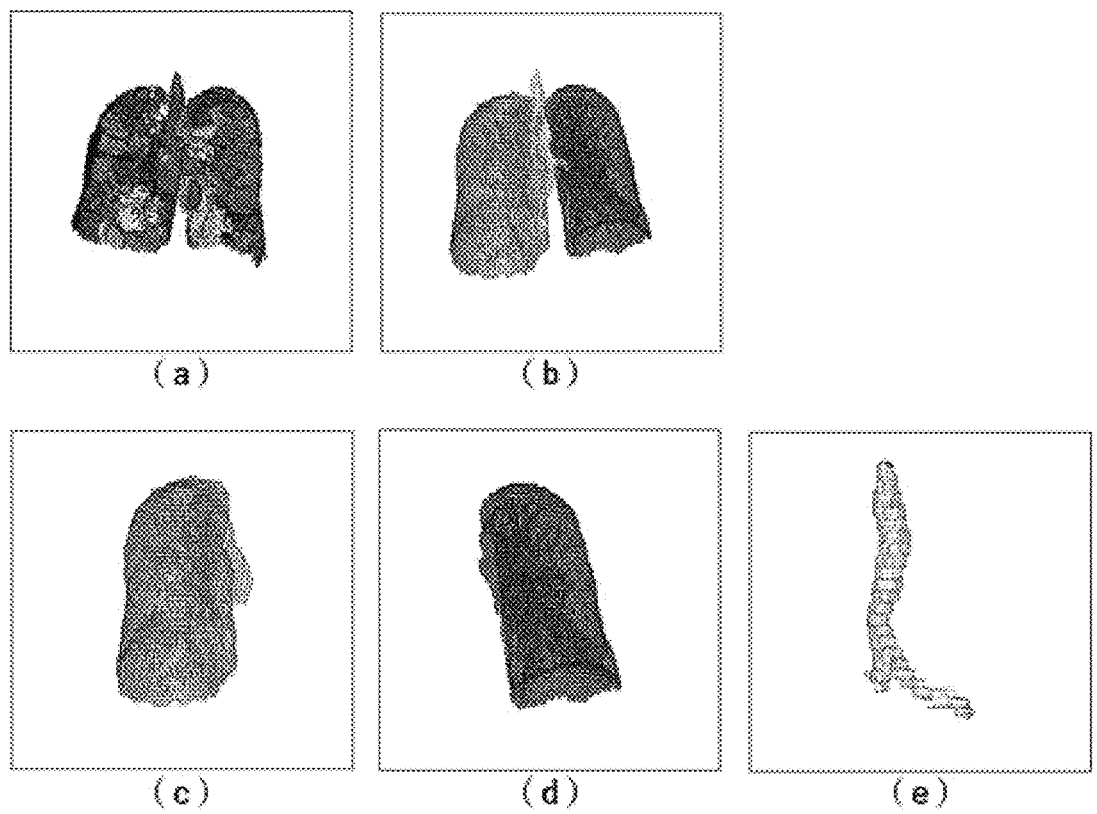

FIG. 11 is a diagram showing a stereoscopic display of generated segments in an example in which a method for generating is applied. In the organ segment generation section (250), the segments generated from the binary 3D data in which a series of organs belonging to the respiratory system are connected are merged, and three segments corresponding to the individual organs, the right lung, the left lung, and the trachea, are generated.

FIG. 11(a) is the input of the organ segment generator. FIG. 11(b) is a diagram showing three individual organs, the right lung, left lung, and trachea, at the same time. FIG. 11(c), FIG. 11(d), and FIG. 11(e) show the right lung, the left lung, and the trachea separately, respectively.

Figure 12:
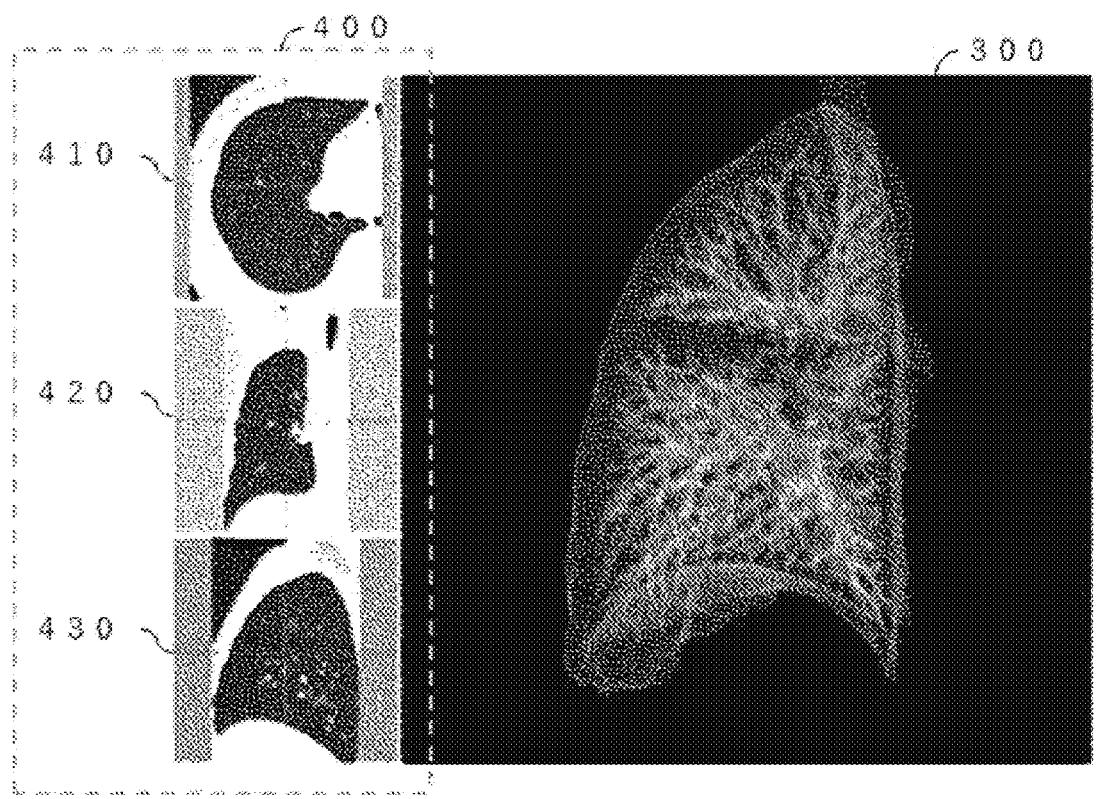

FIG. 12 is a diagram showing a stereoscopic display (300) of a segment of the right lung and regions of this segment displayed as partial axial plain (410), partial coronal plain (420) and partial sagittal plain (430).

DETAILED DESCRIPTION OF ILLUSTRATED EMBODIMENTS

An image processing method, an image processing program, and an image processing device according to embodiments of the present invention will be described below with reference to the drawings.

Figure 1:
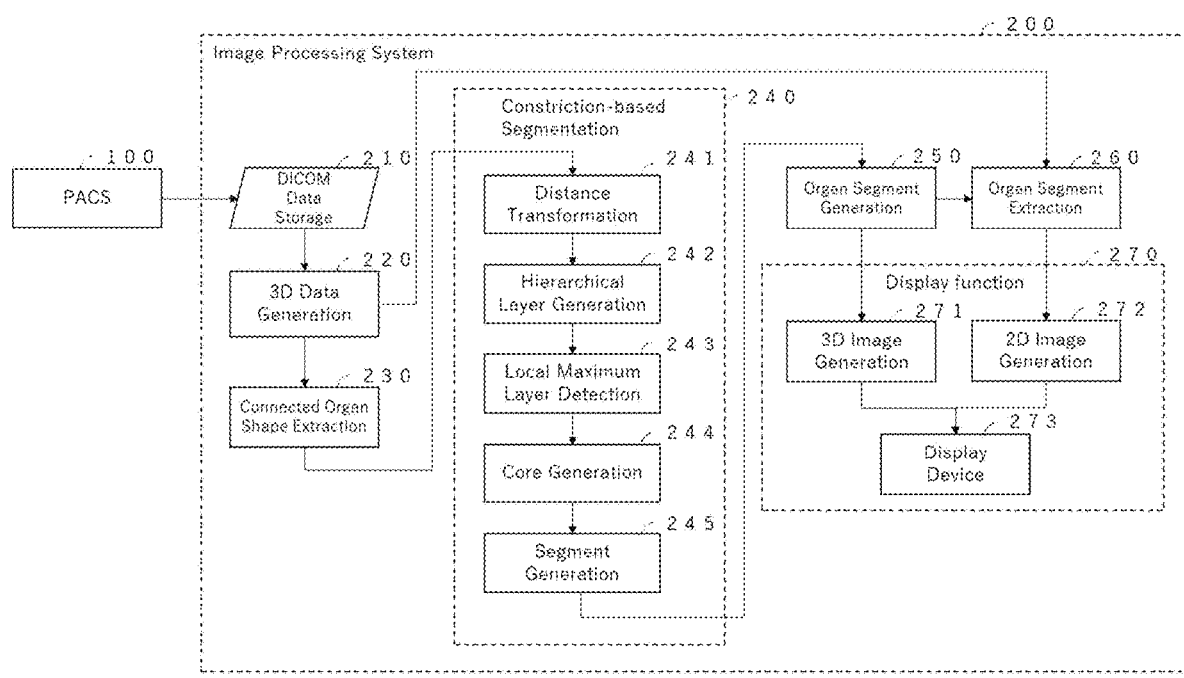
FIG. 1 is a block diagram showing the configuration of an image processing device according to the present invention.

FIG. 1 shows a block diagram of an image processing device according to this embodiment. The device has a medical image management system PACS (Picture Archiving and Communication System) device (100) that stores output data acquired by a medical computed tomography device such as CT and MRI, and an image processing device (200) that receives output data from the PACS device by communication or other means. The image processing device (200) stores the data received from the PACS device in the DICOM data storage section (210) as a file conforming to the DICOM standard.

A set of DICOM files in the DICOM data storage section (210) is converted into 3D data, which is a set of voxels, by a 3D data generation section (220). The X-axis and Y-axis of the 3D data are the horizontal axis and vertical axis of the axial image, respectively, which is the captured image acquired by a medical computed tomography device. The physical pitches of the X-axis and Y-axis are usually the same. An example of an axial image is shown in FIG. 9(a). The Z-axis is the axis perpendicular to the axial image plane. The physical pitch of the Z-axis is typically ranges from around the same to four times to the pitch of the X-axis and Y-axis. The 3D data is composed of unit cubic voxels with a pitch of 1 on each axis. When converting 3D data into unit cubic voxels, the pitches of the X-axis, Y-axis, and Z-axis are set to 1 regardless of the physical pitch. Alternatively, resampling processing may be performed so that the physical pitches of the X-axis, Y-axis, and Z-axis are the same. Also, the resampling may be performed so that the ratio of the physical pitch of the Z-axis to the physical pitch of the X-axis and Y-axis is constant. Since the size of 3D data significantly affects the calculation time for subsequent processing, the data size may be compressed by resampling if the required resolution is satisfied.

The 3D data generation section (220) may apply a Gaussian filter to the input of the 3D data generation section (220) in order to avoid the influence of noise during binarization in the body region extraction step (SC1) described later. Alternatively, various filters may be applied such as an edge enhancement filter that emphasizes boundaries. The filter may be a 2D filter applied to axial images. To apply a 3D filter, it is preferable to perform resampling processing such that the physical pitches of the X-axis, Y-axis, and Z-axis are the same.

A connected organ shape extraction section (230) generates binary 3D data in which the shape of a series of organs is the foreground region and the rest is the background region from the output of the 3D data generation section (220). The processing order of the 3D data generation section (220) and the connected organ shape extraction section (230) may be exchanged as long as the result remains the same.

The constriction segmentation section (240) is composed of a distance transformation section (241), a hierarchical layer generation section (242), a local maximum layer detection section (243), a core generation section (244), and a segment generation section (245), and divides the foreground region into as many segments as the number of the cores. In this embodiment, an example is shown in which the constriction-based segmentation section (240) processes binary 3D data generated from 3D data acquired by a medical computed tomography device.

The data processed by the constriction-based segmentation section (240) can be any binary 3D data, such as data obtained by measuring an object with a 3D scanner, or output data of a 3D CAD device.

The organ segment generation section (250) merges adjacent segment pairs to match the shape of the individual organ from segments generated by the constriction-based segmentation section (240) from the output of the connected organ shape extraction section (230), depending on the characteristics of the segments or the connection characteristics of the segments. The characteristics of the segments can be the number of voxels or the maximum distance of voxels. The connection characteristics of the segments can be the number of voxels on the boundary surface or the maximum distance value of voxels on the boundary surface.

The organ segment extraction section (260) extracts a rectangular region from the 3D data generated by the 3D data generation section (220) that includes the segments of an individual organ specified from the segments of organs generated by the organ segment generation section (250). Alternatively, the extracted region can be the region of the organ segment instead of the rectangular region.

A stereoscopic image generation section (271) of a display function section (270) displays the organ segments generated by the organ segment generation section (250) generates data for stereoscopic display that makes it possible to identify the internal structure. Showing the segments in a translucent stereoscopic manner by giving distinct colors to each organ, as an example.

A 2D image generation section (272) generates partial 2D images for displaying a region corresponding to an individual organ from the output of the organ segment extraction section (260) as axial planes, coronal planes, and sagittal planes. The display device (273) displays images generated by the stereoscopic image generation section (271) and the 2D image generation section (272).

Figure 2:
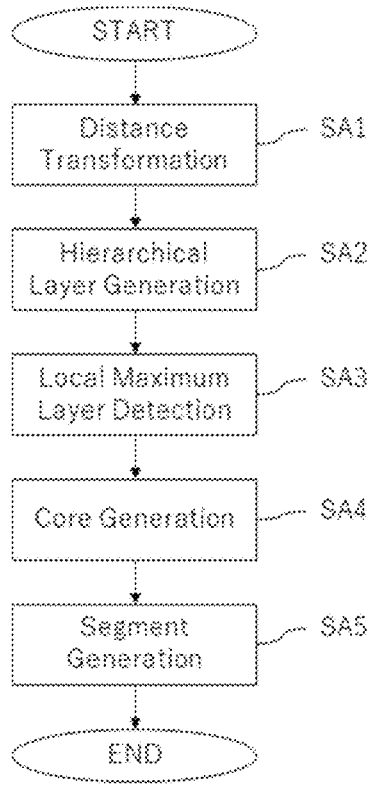
FIG. 2 is a flowchart for explaining the operation of the constriction-based segmentation section (240).

FIG. 2 is a flow chart showing how the constriction-based segmentation section (240) divides the foreground region of the binary 3D data into segments at the narrow part of the shape.

The distance conversion step (SA1) calculates the shortest distance from the boundary with the background region for voxels in each foreground region. Since a voxel is a unit cube, the distance is the Euclidean distance where the distance between voxels is 1.

The layer formation step (SA2) converts the foreground region into layers having stepped distance values by integerization. Integerization is performed by rounding off. By integerization, a hierarchical structure is formed as stepped layers in which the value of the layer increases from the boundary with the background region toward the inside of the foreground region. The structure exhibits the property of having fewer layers in narrower parts of the foreground region. Round down or round up may be used for integerization. Moreover, since the resolution of the layer affects the calculation time and the unevenness of the boundary surface of the segment, the unit for converting the distance to an integer may be a value other than 1.

The local maximum layer detection step (SA3) detects layers having a larger integer value than adjacent layers as a local maximum layer. The local maximum layer can be described as a layer that does not contain other layers inside. Since the value of the layer incrementally increases toward the inside from the boundary with the background region, local maximum layers occur near the center of the dilated parts of the foreground region.

In the core generation step (SA4), a unique number is assigned to the local maximum layers by labeling process and the labeled local maximum layers are used as cores for generating segments in the next step. The segment generation step (SA5) extends the core by incrementally adding the voxels in the surrounding layer of the core and adjacent to the core to the core.

Figure 3:
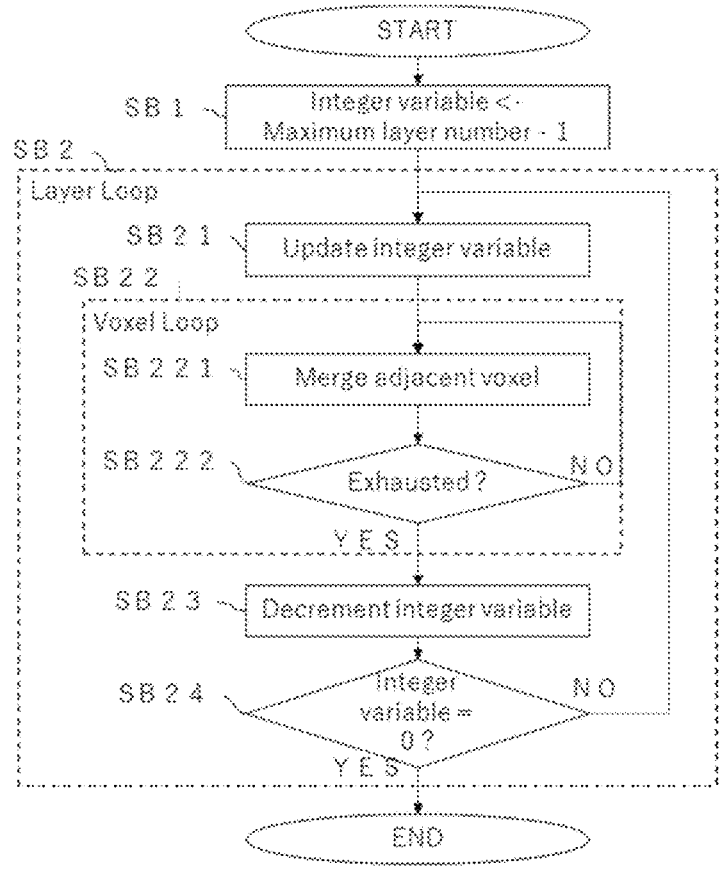
FIG. 3 is a flowchart for explaining the operation of a segment generation step (SA5) in constriction-based segmentation section (240).

FIG. 3 is a flow chart showing a method of generating segments by extending the core in the segment generation step (SA5).

The step SB1 initially sets an integer variable that specifies layers to be used in the next step to (maximum integer value−1), which is the value of the layer surrounding the core with the largest integer value The step SB2 is a layer loop step in which the voxels in the surrounding layer of the core and adjacent to the core are added to the core incrementally, and includes steps SB21, SB22, SB23, and SB24 described below.

The step SB21 updates the integer variable.

The step SB22 is a voxel loop step in which voxels in the layers whose values match the integer variable and adjacent to the core are added to the core incrementally, and this step includes sub steps SB221 and SB222 described below.

In the merge adjacent voxel step SB221, voxels belonging to the layer of the integer variable and adjacent to the core are added to the core incrementally.

The exhausted check step SB222 determines whether or not all the voxels of the layer of the integer variable have been added to the core and returns to step SB221 step if there are voxels that have not been added.

The decrement integer variable step SB23 is a process when all the voxels of the layer of the integer variable have been added to the core, and the integer variable is decremented.

In the integer variable zero check step SB24, it is determined whether or not the integer distance value represented by the integer variable has become zero. If it is not, the process returns to step SB21, the process ends otherwise.

When the segment generation step (SA5) ends and the integer distance value represented by the integer variable becomes zero, all voxels in the foreground region are divided into as many segments as the number of the cores.

The segment generation step (SA5) is a process of determining how to allocate voxels of the integer variable layer to each core when there is a plurality of cores whose perimeter is the layer. If the layer has only one core, such processing is meaningless, so all voxels of the layer may be added to the core without the step.

In the merge adjacent voxel step (SB221), it will be explained that the degree of unevenness of the boundary surface of the segments and the processing time differ depending on the method of defining the adjacency of voxels.

Figure 4:
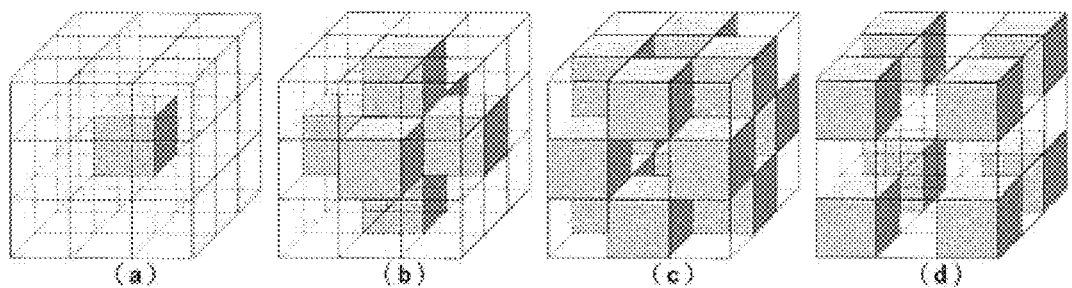
FIG. 4 is a diagram showing the positional relationship of surface contact voxels, line contact voxels, and point contact voxels.

FIG. 4 shows how a pair of voxels contacts in 3D data. A certain voxel FIG. 4(a) is adjacent to 6 voxels that are in contact with a plane shown in FIG. 4(b), adjacent to 12 voxels that are in contact with the line shown in FIG. 4(c), and adjacent to 8 voxels that are in contact at the point shown in FIG. 4(d). The voxel is adjacent to 26 voxels of 3 types. The center-to-center distance between a voxel and its adjacent voxel is 1 for surface contacting voxels, root 2 for line contacting voxels, and root 3 for point contacting voxels.

When adding voxels adjacent to the core to the core, if voxel loop processing is performed in the order of surface contact voxels, line contact voxels, and point contact voxels in order of shortest distance, the unevenness of the dividing surface of the segment can be reduced.

On the other hand, if the voxel loop processing is performed only for the surface contact voxels, the calculation time of the merge adjacent voxel step is shorter, but depending on the shape of the foreground region, up to three times of the voxel loop is needed for the point contact voxels.

For this reason, the process of adding voxels in the point contact direction to the core is slower than in the surface contact direction, and different the degree of progress depending on the direction of voxels results in segment boundary distortion.

On the other hand, the voxel loop processing is performed for all of the surface contact voxels, the line contact voxels, and the point contact voxels at once, the calculation time of the merge adjacent voxel step is also shorter, but depending on the shape of the foreground region, the progress may be faster in the point contact direction than in the surface contact direction.

For this reason, the process of adding voxels in the surface contact direction is slower than in the point contact direction, and different the degree of progress depending on the direction of voxels results in segment boundary distortion.

For applications where the processing time is more important than the degree of unevenness of the boundary surface of the segments, the definition of the adjacency between voxels can be only surface contact, or all of the surface contact, line contact, and point contact without distinction.

Although the processes such as distance conversion and labeling in the constriction-based segmentation section (240) described above are 3D processes, these processes can be similarly processed for arbitrary dimensional data. Therefore, the constriction-based segmentation section (240) can divide binary data such as 1D, 2D, and 4D data at the part of geometrical constriction.

The processing of the constriction-based segmentation section (240) will be specifically described using a simple binary 3D shape.

Figure 5:
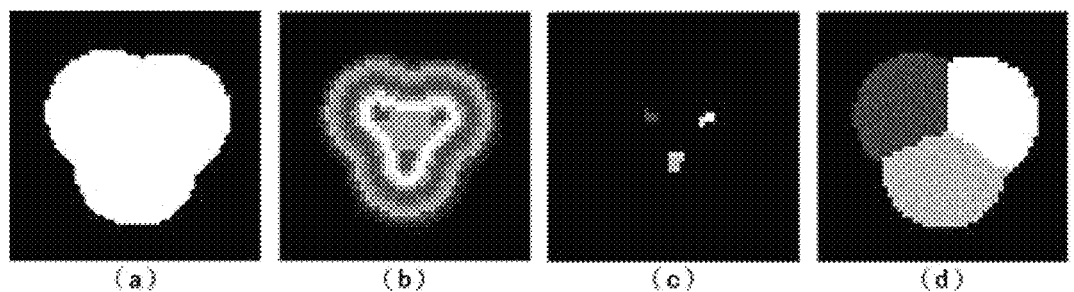
FIG. 5 is a central cross-sectional view of 3D object showing an example of segmenting low-resolution binary 3D data showing three connected spheres are segmented at geometrically constricted locations.

FIG. 5 shows a central sectional view of 3D data in which 3 spheres of 50 elements of diameter on the X, Y, and Z axes are combined in a 3D space.

FIG. 5(a) is binary 3D data in which three spheres are combined.

A hierarchical layer structure is generated by applying the distance conversion step (SA1) and the hierarchization step (SA2) to the data.

FIG. 5(b) shows the generated hierarchical structure as a striped pattern.

The gray scale image shown in FIG. 5(b) is actually a color image using distinct colors for each layer.

By applying the local maximum layer detection step (SA3) to the hierarchical structure, the local maximum layers are detected in the centers of the three spheres.

Since the core generation step (SA4) assigns individual numbers to the local maximum layers, the three cores are displayed in different gray scale values corresponding to the individual numbers in FIG. 5(c).

The segment generation step (SA5) extends the core incrementally to generate three segments.

FIG. 5(d) shows that the foreground region has been divided into three segments.

FIG. 5(c) and FIG. 5(d) are actually color images using colors corresponding to the individual numbers assigned to the cores.

Figure 6:
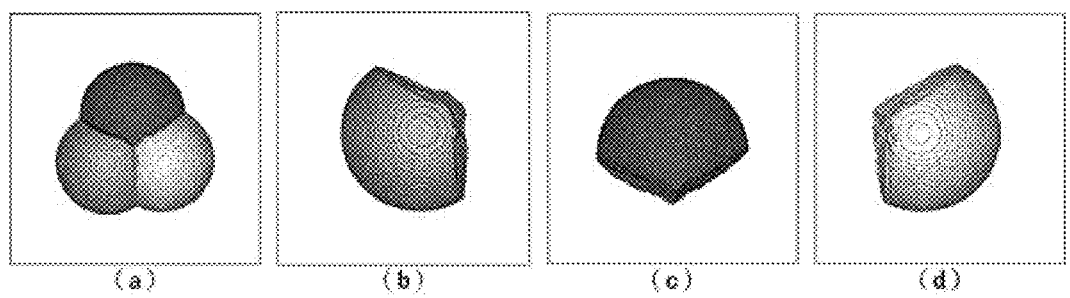
FIG. 6 is a 3D representation of segments obtained by partitioning high-resolution binary 3D data representing three connected spheres at geometrically constricted locations.

FIG. 6 shows, as an example corresponding to the size of an organ in practical CT and MiII resolution. The size of the voxel space for the three spheres shown in the figure is enlarged to 200 elements. The original figure is a colored in order to distinguish the generated segments.

FIG. 6(a) shows three segments simultaneously. FIG. 6(b), FIG. 6(c), and FIG. 6(d) show the three segments independently. As is clear from these figures, the process of the constriction-based segmentation section (240) generates a boundary surface with less unevenness from the binary 3D data representing three connected spheres and divides them into segments corresponding to the respective spheres. indicates that FIG. 6(a), FIG. 6(b), FIG. 6(c) and FIG. 6(d) are actually color images using colors corresponding to the individual numbers given to the cores.

Figure 7:
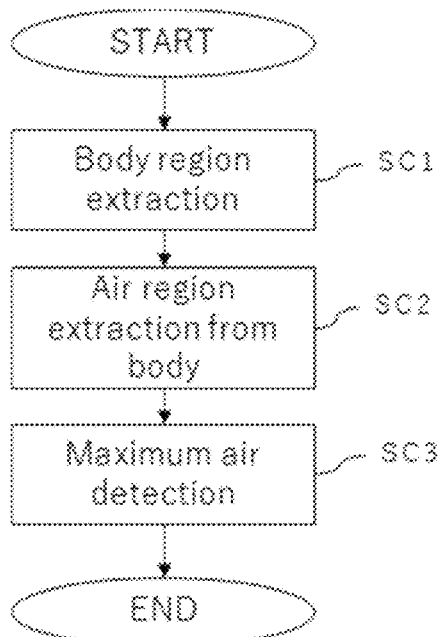
FIG. 7 is a flowchart for explaining a method for generating binary 3D data in which a series of organs belonging to the respiratory system are connected from 3D CT data in a connected organ shape extraction section (230).

FIG. 7 shows a flowchart of an example of extracting a shape of a series of organs belonging to the respiratory system from in 3D CT data in the connected organ shape extraction section (230).

A series of organs belonging to the respiratory system in CT 3D data can be extracted as the largest size air approximation region in the body. The air approximation region is composed of voxels having a CT value approximate air as −1000 in HU value (Haunsfield Unit). An example of approximate air is voxels with CT value of below −200.

The body region extraction step (SC1) is a process of replacing the region outside of body with 0, which is the CT value of water.

First, the 3D CT data is binarized by thresholding with 1 for areas where the CT value is higher than the HU of fat on the human body surface and 0 for other areas. An example of fat on the human body surface is voxels with CT value of over −550. When the first labeling process is applied to this data, the human body region is extracted as the largest region. Binary data is generated as 1 for the body region and 0 otherwise.

Next, the binary data is inverted as the body region is 0 and 1 for otherwise, and the second labeling process is applied to the inverted binary data. The labels connected to the eight corners of the 3D data are extracted, and the regions of the labels are given a value of 1 as regions outside of the body, and the rest are given a value of 0 as body.

The binarization in the body region extraction step (SC1) has shown using fixed threshold value as an example.

However, other means such as the discriminant analysis method and the P-tile method may be used.

FIG. 8 shows the eight corners of a 3D space. The eight corners are obtained by combinations of the maximum and minimum values of the X, Y, and Z axes, and are indicated by small spheres in FIG. 8. The solid object inside the rectangular parallelepiped frame in FIG. 8 is an arbitrary object to show the image of the 3D data space.

In many cases, the region outside of body can be obtained as the largest region from the result of the second labeling process. The reason why the region outside of body is combined labels connected to the eight corners of the 3D data is that the external air approximation region in CT data sometimes is split into multiple regions by the human body.

By inverting the data of the region outside of body to create mask data in which the region outside of body is 0 and 1 otherwise. Then, when the mask is multiplied to the output data of the 3D data generation section (220) for each voxel, the body-only data is created by replacing the region outside of body by 0, the HU value of water.

In the air region extraction from body step (SC2), a threshold value is set so that the air approximation region is 1 and the rest is 0 for the body only data, and the body air approximation region is extracted. The body air approximation region includes an approximation region in respiratory system organs and in digestive system organs, and others. In the maximum air detection step (SC3), the third labeling process is applied to the body air approximate region, and the largest region is selected. As a result, the air approximation region of the digestive system organ, which is smaller than the region of the respiratory system organ, is removed to obtain binary 3D data representing the region of the respiratory system organ.

FIG. 9 is an example of the central cross-sectional view in which the connected organ shape extraction section (230) generates binary 3D data of respiratory system organs from 3D data of chest CT.

FIG. 9(a) is input data. FIG. 9(b) is data replacing the region outside of body with 0, which is the CT value of water, and removing the region outside of body in the body region extraction step (SC1). FIG. 9(c) shows the respiratory system organ, obtained firstly by binarizing the body air approximation region by the air region extraction from body step (SC2), and secondly by extracting as the maximum region by the third labeling process in the maximum air detection step (SC3).

When generating the binary 3D data of the respiratory system organs, some regions may be missing or regions other than the respiratory system organ may be extracted, depending on the patient's body composition, CT imaging conditions, and processing parameters in the 3D data generation section (220).

In this example, the connected organ shape extraction section (230) extracts a series of organs belonging to the respiratory system from 3D chest CT data. Because there are various methods for obtaining the data, depending on parameters such as the modality of a medical computed tomography device, the type of the organ system, the image processing method for binarization, and others. The specific processing procedure in the connected organ data generation section (230) is not limited to the method described above.

FIG. 10 is a flow chart when the organ segment generation section (250) performs processing for matching the segment generated by the constriction-based segmentation section (240) from the binary 3D data to the shape of the individual organ. In the example of binary 3D data in FIG. 7 showing the shapes of connected respiratory organs, the trachea, bronchi, and bronchioles that enter the inside of the lungs have complex shapes with varying diameters and branching like trees. Therefore, the constriction-based segmentation section (240) produces a large number of segments. The organ segment generation section (250) generates segments corresponding to individual organs by performing merging process of adjacent segments based on the shape features of the individual organ. If the binary 3D data given to the constriction-based segmentation section (240) does not include all the assumed organs, some parts of the organs may be missing in the output of the organ segment generation section (250). In addition, when the binary 3D data includes all elements other than the assumed organ, elements other than the assumed organ may be generated in the output of the organ segment generator (250).

The extend single ended segment step (SD1) is a process assuming an organ having a tubular shape. A segment with an adjacent segment count of 1 is merged to its adjacent segment. By repeating this process until there are no more segment pairs that satisfy the condition, the segment at the tip of the tube is extended accordingly. The merge adjacent small segment step (SD2) is the process of merging small segments to adjacent large segments. By repeating this process until there are no more segment pairs that satisfy this condition, small segments are merged into adjacent large segments.

A small segment is, for example, a segment whose total number of voxels in adjacent planes to other segments exceeds 0.1 times the number of voxels in that segment.

The merge adjacent large segment step (SD3) is a process when a segment that should originally be a single segment is divided into multiple segments due to subtle irregularities in the surface of the segment, or the internal structure of the segment. Segment pairs with a large maximum distance values in the core before segment extension and a large maximum distance value in the voxel of the surface with the adjacent segment are merged. By repeating this process until there are no more segment pairs that satisfy this condition, a segment that should originally be a single segment is generated. A large segment pair is, for example, a pair of segments in which the ratio of the maximum distance value of the core before extension to the adjacent segment is within ±40%.

An example of the segment pair with a large maximum voxel distance value on the contact surface with an adjacent segment is a segment pairs where the maximum distance value of the voxel at the surface with the adjacent segment exceeds 50% of the maximum distance value of the core before extension of the segment.

FIG. 11 shows the result of the organ segment generation section (250) in 3D, which is generating individual organ segments from the output of the constriction-based segmentation section (240) for the example of a series of organs belonging to the respiratory system of the chest CT shown in FIG. 7.

FIG. 11(a) is the output of the constriction-based segmentation section (240), with 148 segments generated in this example. FIG. 11(b) shows the trachea, right lung, and left lung segments, which are generated by the organ segment generation section (250), and colored translucent stereoscopically displayed. This 3D display can be freely rotated, translated, and scaled by operating the keyboard or mouse, allowing intuitive understanding of the mutual positional relationships and detailed internal structures of the respiratory system organs. In addition, since an individual organ can be identified in the segment of the organ displayed in a colored translucent stereoscopic display, it can also be used for visually selecting an organ when displaying the individual organ, which will be described later.

FIG. 11(c), FIG. 11(d), and FIG. 11(e) are 3D representations of the right lung, left lung, and trachea, respectively. As is clear from these figures, the organ segment generation section (250) generates segments corresponding to the shapes of individual organs. Although the figures FIG. 11(a), FIG. 11(b), FIG. 11(c), FIG. 11(d), and FIG. 11(e) are gray scale images, they are actually color images using distinct colors for each segment.

It should be noted that, as a custom in medical images, output data is horizontally reversed and displayed, so the right lung is displayed on the left side.

The example of FIG. 11 shows an example of generating individual organ segments by merging a series of organ segments belonging to the respiratory system from 3D CT data generated by the constriction-based segmentation section (240). In addition to the specific processing of organ segment generation described here, there are various possibilities for organ shape generation, depending on the shape characteristics of the organ and the processing method for merging segments into individual organ shapes.

FIG. 12 is an example of extracting respiratory organs from the chest CT 3D data and shows data on the display when the right lung segment is selected.

First, the right lung segment is selected from the organ segment generation section (250). The semi-transparent stereoscopic display of individual organ segments (300) is a semi-transparent stereoscopic representation of the segment of the right lung in order to visualize the outer surface and internal structure of the right lung. This 3D display can be freely rotated, translated, and scaled by operating the keyboard or mouse, so that the external shape and internal structure of an organ can be intuitively recognized.

The organ segment extraction section (260) cuts out a cuboid region corresponding to the segment of the right lung from the output of the 3D data generation section (220). A 2D display (400) is a cut-out partial 2D image display, displaying partial 2D images in partial axial plane (410), partial coronal plane (420), and partial sagittal plane (430). Since the positions of these three types of 2D images on the axis perpendicular to each plane can be changed by operating a keyboard, mouse, and etc., any location in the organ can be observed in detail.

As described above, when the present invention is applied to medical images, diagnosis can be performed using partial 2D images limited to a region including a selected organ. There is an advantage that the 3D shape can be grasped intuitively.

CODE EXPLANATION

100 Picture Archiving and Communication System
200 Image processing system
210 DICOM data storage section
220 3D data generator section
230 Connected organ shape extraction section
240 Constriction-based segmentation section
241 Distance transformation section
242 Hierarchical layer generation section
243 Local maximum layer detection section
244 Core generation section
245 Segment generation section
250 Organ segment generation section
260 Organ segment extraction section
270 Display function section
271 3D image generation section
272 2D image generation section
273 Display device
SA1 Distance transformation step
SA2 Hierarchical layer generation step
SA3 Local maximum layer detection step SA4 Core generation step
SA5 Segment generation step
SB1 Integer variable initialization step
SB2 Layer loop
SB21 Update integer variable step
SB22 Voxel loop
SB221 Merge adjacent voxel step
SB222 Exhausted check step
SB23 Decrement integer variable step
SB24 Integer variable zero check step
SC1 Body region extraction step
SC2 Air region extraction from body step
SC3 Maximum air detection step
SD1 Extend single ended segment step
SD2 Merge adjacent small segment step
SD3 Merge adjacent large segment step
300 Stereoscopic display area
400 2D display area
410 Partial axial plane display
420 Partial coronal plane display
430 Partial sagittal plane display

The invention claimed is:

1. An image processing method executed by a computer for partitioning a 3D object comprising:
   receiving 3D image data; and
   generating segmented image data comprising:
   calculating a distance value between each of foreground voxels and boundary of foreground and background regions from binary 3D data that distinguishes the foreground region from the background region;
   generating hierarchical layers each of which is composed of the foreground voxels having a layer-value that is the same integer value by converting the distance value to an integer value;
   identifying layers each of which has a larger integer value than layers surrounding the layer as local maximum layers;
   defining each of the local maximum layers distinguished by a unique number as a core;
   generating a segment by adding the foreground voxels in a surrounding layer with an integer variable to the core, the surrounding layer being the layer surrounding the core,
   wherein the generating the segment includes starting with an integer variable that is one less than the largest integer value from the layer-value of the local maximum layers, and repeats until the integer value is 1, and
   wherein while adding the foreground voxels in a layer with an integer variable to the core, the foreground voxels in the layer with the integer variable are added to the core in order of surface contact with the voxel of the core, line contact with the voxel of the core, and point contact with the voxel of the core.

2. An image processing device configured to be executed by a computer for partitioning a 3D object, the image processing device comprising:
   an input unit for receiving information;
   a memory device for storing the received information;
   a processor; and
   a display device for displaying the processing results;
   wherein the processing of the processor includes:
   calculating a distance value between each of foreground voxels and boundary of foreground and background regions from binary 3D data that distinguishes the foreground region from the background region;
   generating hierarchical layers each of which is composed of the foreground voxels having a layer-value that is the same integer value by converting the distance value to an integer value;
   identifying layers each of which has a larger integer value than layers surrounding the layer as local maximum layers;
   defining each of the local maximum layers distinguished by a unique number as a core; and
   generating a segment by adding the foreground voxels in a surrounding layer with an integer variable to the core, the surrounding layer being the layer surrounding the core,
   wherein the generating the segment includes starting with an integer variable that is one less than the largest integer value from the layer-value of the local maximum layers, and repeats until the integer value is 1, and
   wherein while adding the foreground voxels in a layer with an integer variable to the core, the foreground voxels in the layer with the integer variable are added to the core in order of surface contact with the voxel of the core, line contact with the voxel of the core, and point contact with the voxel of the core.

3. An image processing device according to claim 2, further comprising:
   generating binary 3D data corresponding to a series of organs from 3D data received from a medical computed tomography device; and
   generating a segment of an individual organ by merging plurality of the segments.

4. An image processing device according to claim 3, further comprising:
   generating a stereoscopic image capable of identifying an outer surface and internal structure of each organ from the segment of the individual organ.

5. An image processing device according to claim 3, further comprising:
   cutting out a partial region corresponding to a segment of an individual organ from 3D data received from a medical computer tomographic device that generates partial tomographic images as axial, coronal and sagittal planes from the partial region.

* * * * *